United States Patent

[11] 3,601,959

| [72] | Inventor | Jesse R. Pinkham |
| | | Winston-Salem, N.C. |
| [21] | Appl. No. | 854,058 |
| [22] | Filed | Aug. 29, 1969 |
| [45] | Patented | Aug. 31, 1971 |
| [73] | Assignee | R. J. Reynolds Tobacco Company |
| | | Winston-Salem, N.C. |
| | | Continuation-in-part of application Ser. No. 825,625, May 19, 1969. |

[54] METHOD AND APPARATUS FOR HARVESTING TOBACCO
13 Claims, 21 Drawing Figs.

[52] U.S. Cl. ............................................. 56/27.5
[51] Int. Cl. ........................................... A01d 45/16
[50] Field of Search ............................. 56/27, 5, 19, 128, 129; 280/43, 23, 463

[56] References Cited
UNITED STATES PATENTS

| 2,610,562 | 9/1952 | Ward | 280/463 |
| 2,696,069 | 12/1954 | Hawkins | 56/27.5 |
| 2,816,411 | 12/1957 | Wilson | 56/27.5 |
| 2,834,174 | 5/1958 | Suggs et al. | 56/27.5 |
| 3,507,103 | 4/1970 | Pickett et al. | 56/27.5 |

Primary Examiner—Russell R. Kinsey
Attorneys—Lester W. Clark, Robert S. Dunham, P. E. Henninger, Thomas F. Moran, Gerald W. Griffin, R. Bradlee Boal, Christopher C. Dunham and Robert Scobey ABSTRACT: Method and apparatus for defoliating vertically limited sections of tobacco plants including a vehicle capable of straddling and passing along a row of tobacco plants and a defoliator mounted on the vehicle for stripping the leaves from the stalks upon movement of the vehicle. The defoliator comprises a pair of flexible rotating webs having scalloped, twisted edges; a pair of leaf removal means, one on each side of the apparatus, carry away the leaves to collector boxes, the leaf removal means being provided with a device for preventing the leaves from being trapped between or falling between the two leaf removal means. There are also provided: a device for positioning misaligned stalks; a mechanism for positioning the defoliator both transverse to the row of plants and vertically along selected sections of the plants; a device for steering the vehicle along a path longitudinal of the row of plants; and independent means connecting at least each of the front wheels to the frame of the apparatus, and operable to change the vertical position of each wheel relative to the frame, so as to accommodate changes in the contour of the ground.

INVENTOR.
JESSE R. PINKHAM
BY Lester N. Clark
ATTORNEY

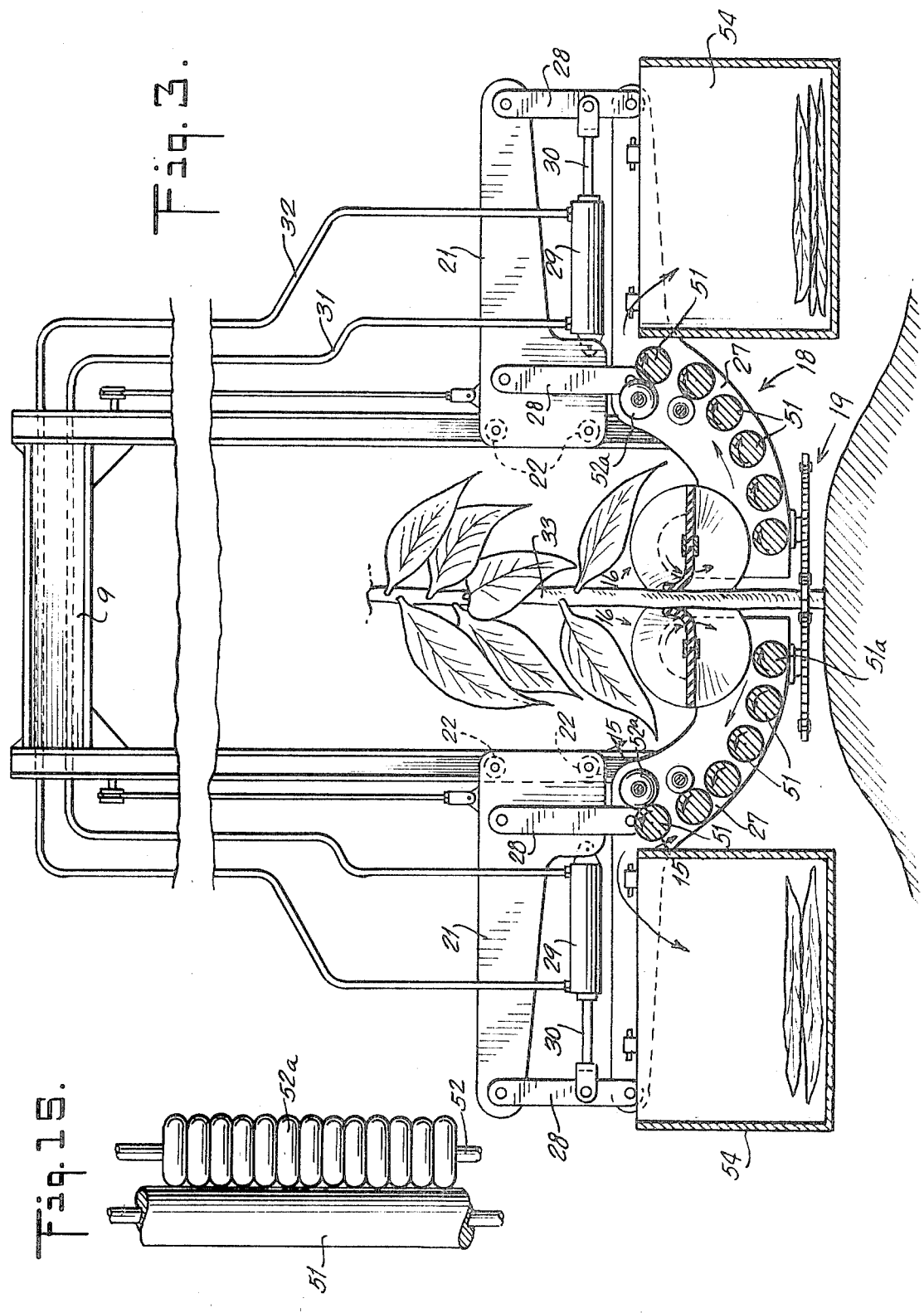

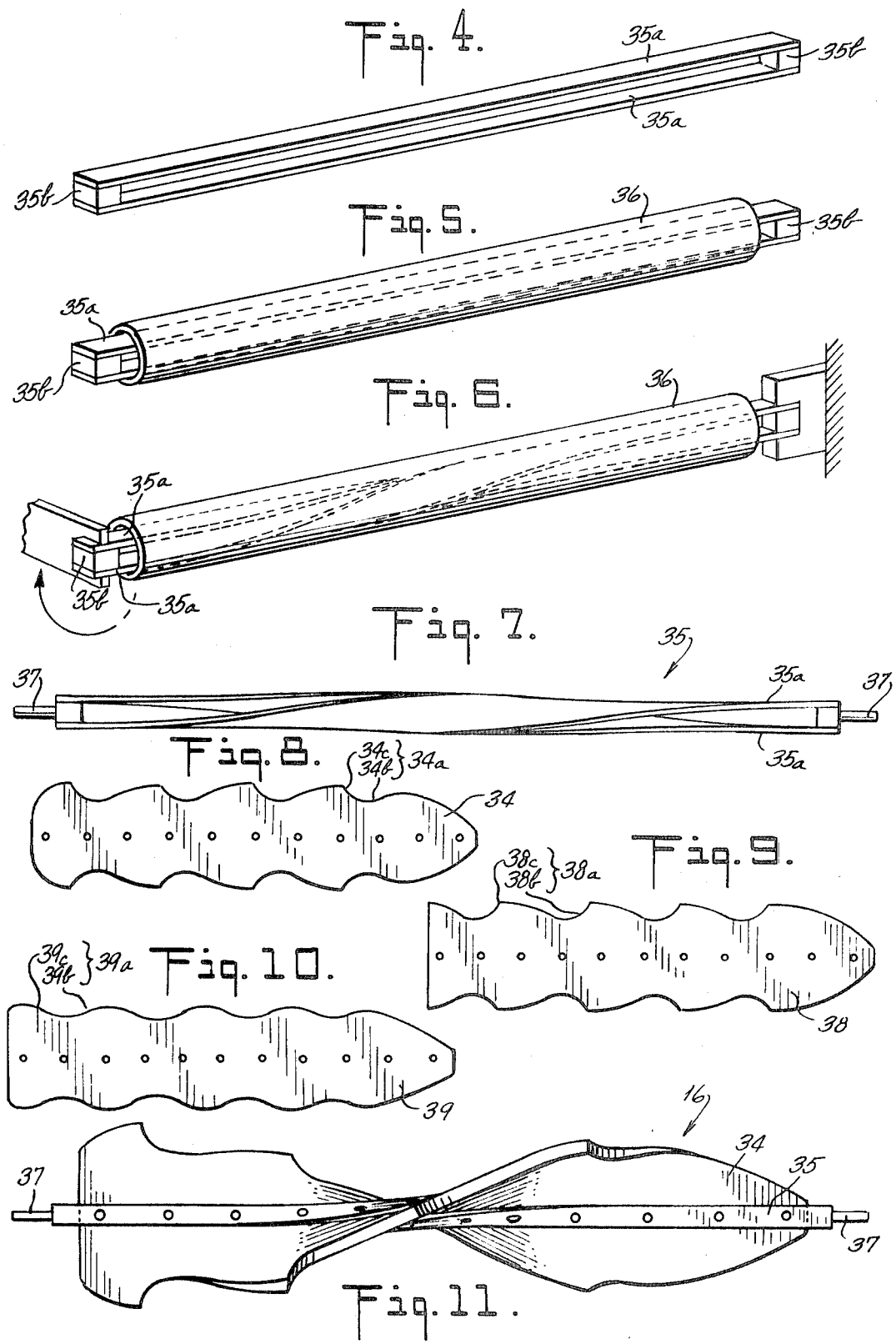

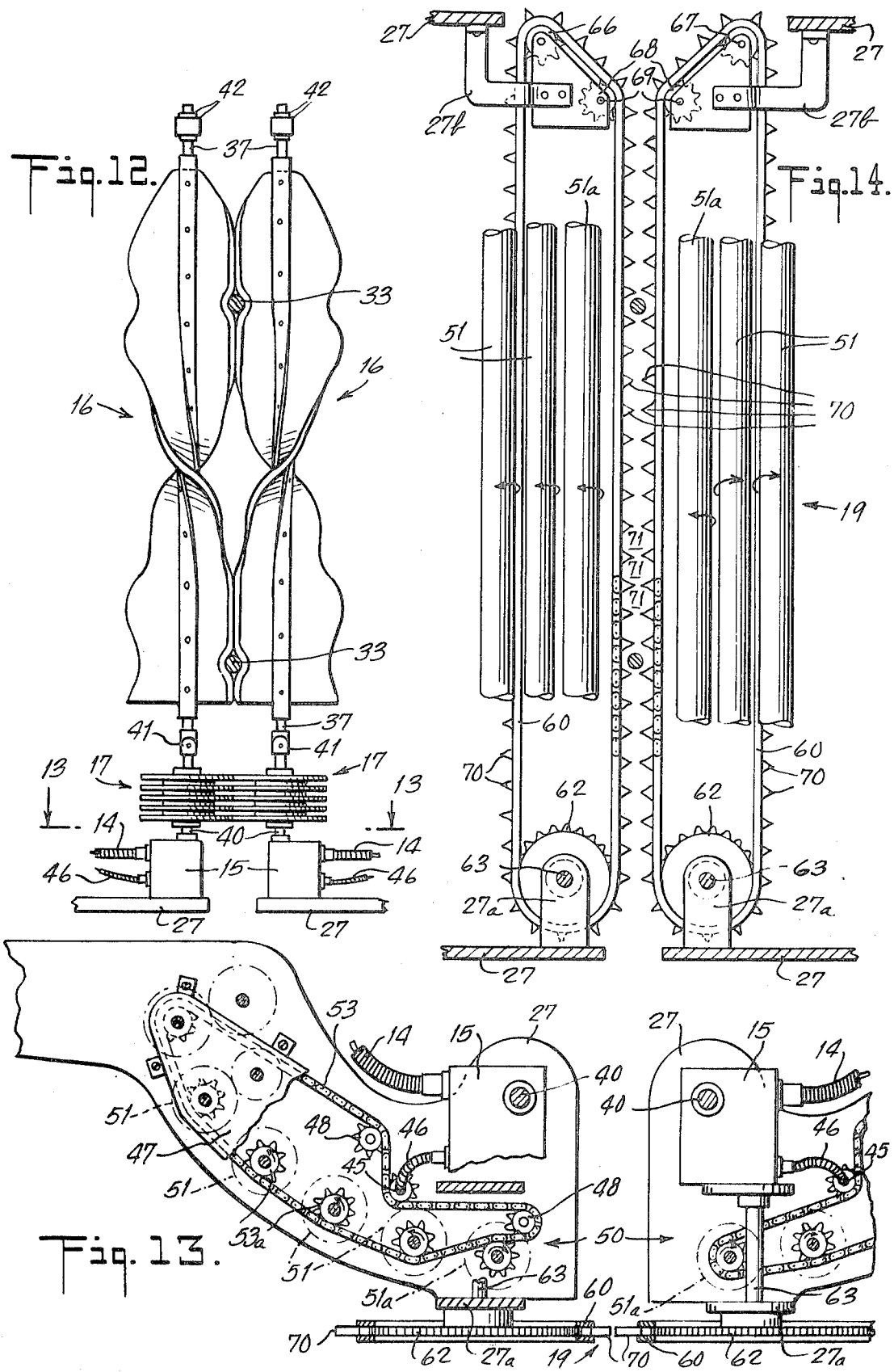

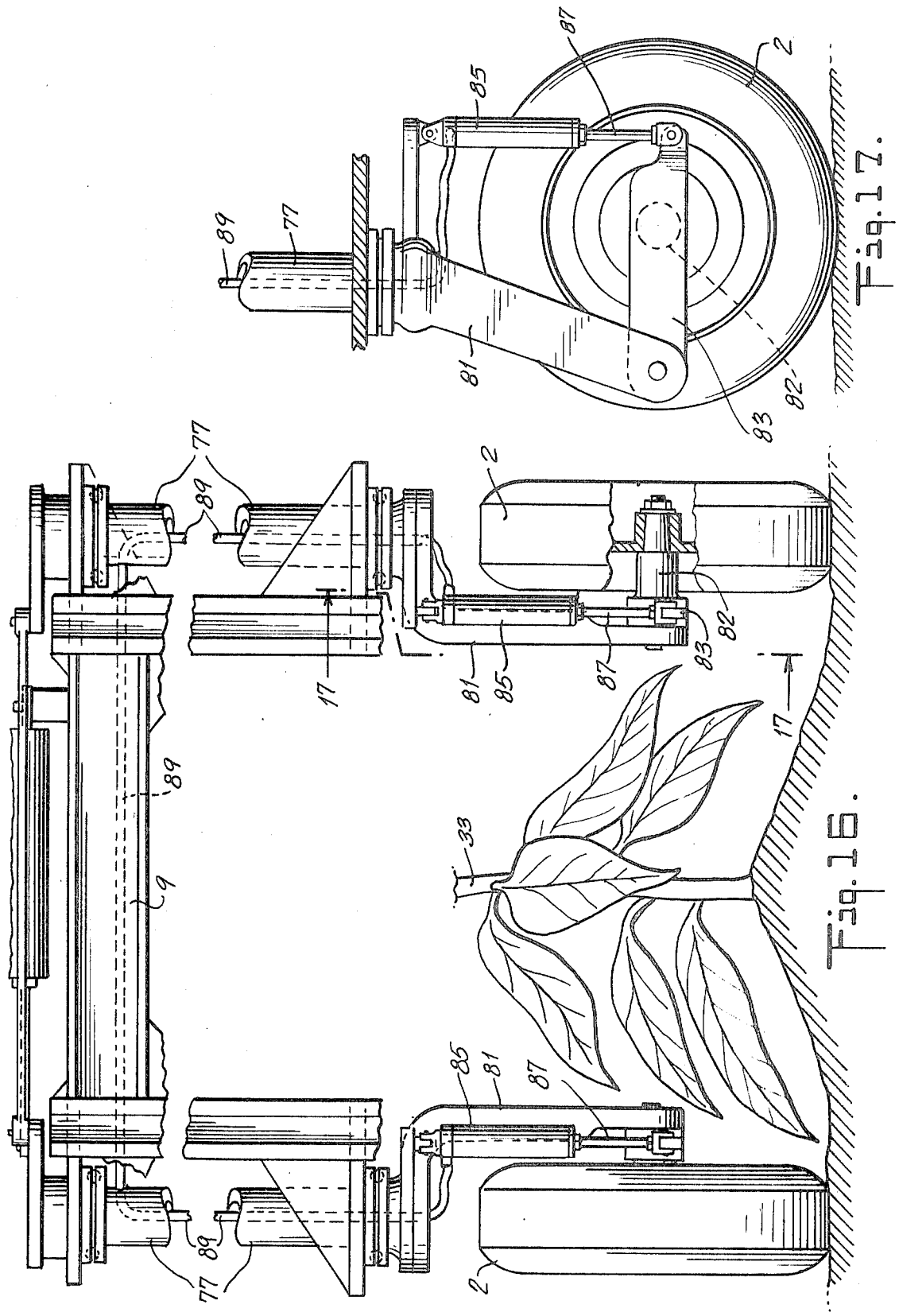

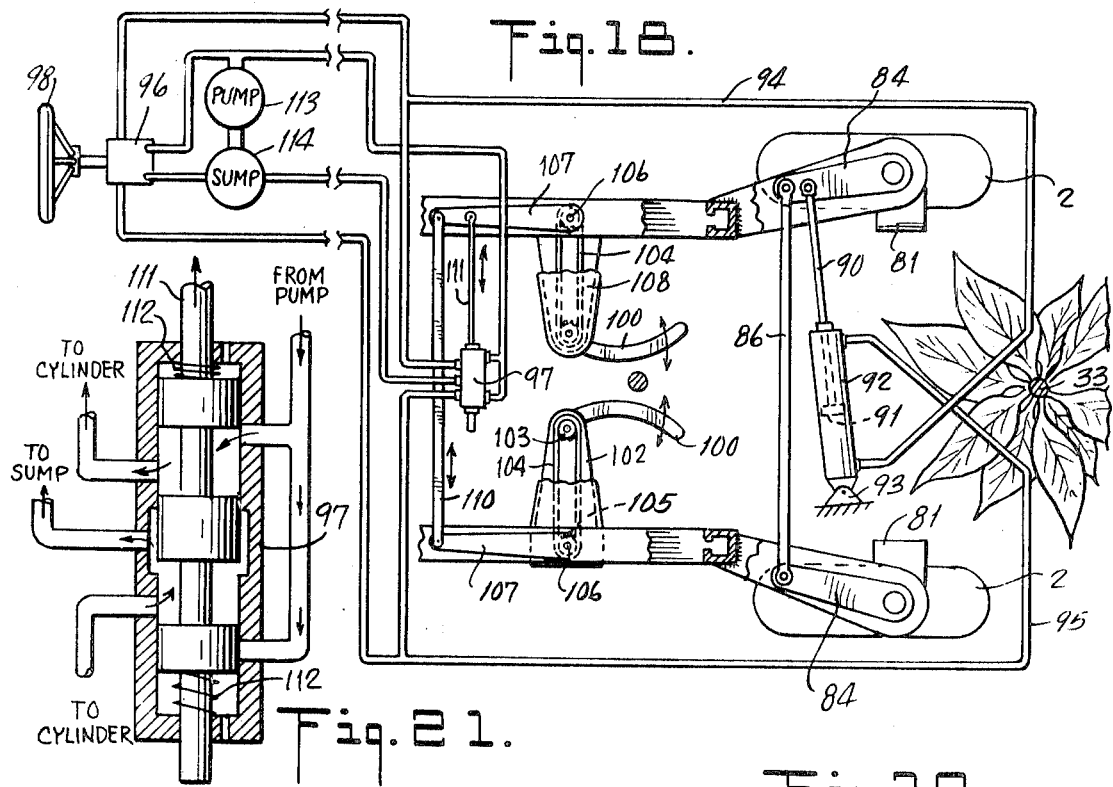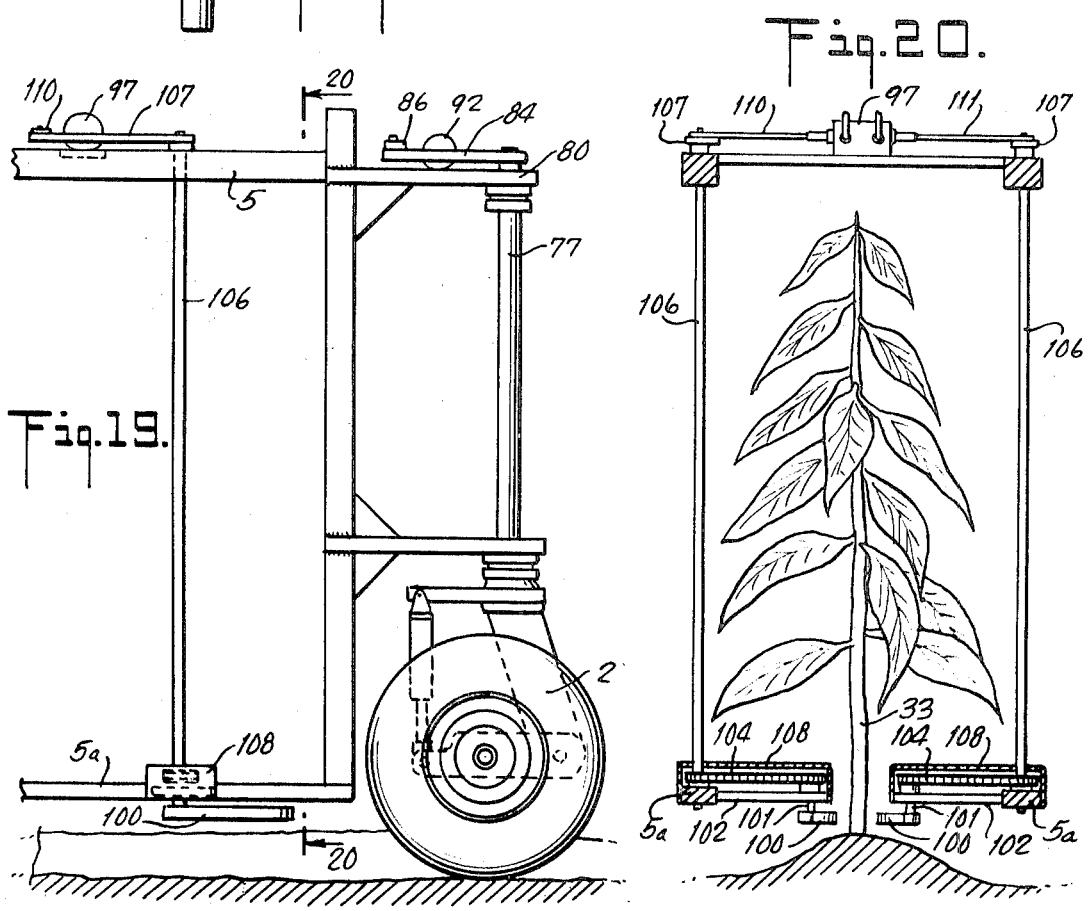

3,601,959

METHOD AND APPARATUS FOR HARVESTING TOBACCO

CROSS-REFERENCE TO RELATED APPLICATION

This application is a continuation-in-part of my copending application for "Method and Apparatus for Harvesting Tobacco," Ser. No. 825,625, filed May 19, 1969.

BACKGROUND OF THE INVENTION

This invention relates to tobacco harvesting methods and apparatus.

Tobacco harvesting devices have been constructed which comprise a vehicle adapted to straddle one or more rows of tobacco plants and carrying, for each row of plants, a pair of defoliators, one located on each side of the row of plants. The defoliators rotate about axes which slant downwardly from the horizontal toward the rear of the vehicle. Each defoliator includes more or less flexible projections, which may be helical, and which engage the leaves of the tobacco plants as the defoliators rotate and strip them downwardly from the stalk. See, for example, the patents to Wilson No. 2,816,411, No. 2,834,173 and No. 3,083,517. The defoliator devices in the prior art apparatus rotate with a peripheral speed which is fast as compared to the motion of the defoliator along the row of plants. While this fast rotation is effective to make sure that the defoliator engages all of the tobacco leaves, nevertheless some of the stalks and unharvested leaves may be damaged by the movement of the defoliators as the pass down the row.

The bottom leaves of a tobacco plant ripen first, and the ripening progresses slowly up the plant, reaching the upper leaves in a period of weeks after the lowest leaves ripen. The harvesting of tobacco leaves is therefore a repeated process of "priming" the plants, i.e., harvesting only those leaves which are ripe or "prime" at one time, and then repeating the process about once a week until all the leaves are harvested.

It is therefore desirable, in a mechanical harvester, that the defoliators operate on only a limited vertical section of the stalks, that the height of that section be controllable by the operator, and that the cut leaves be rapidly carried away. It is also necessary that the defoliators be adjustable to different levels, so that the successive "primings" of the tobacco plants may be carried on at different heights. It is further desirable to provides means for positioning the stalks (i.e., holding the stalks vertical) for priming and for maintaining the defoliators both transverse to the stalks and in a path longitudinal of the row of plants.

SUMMARY OF THE INVENTION

The tobacco harvesting machine of the present invention includes improvements in the defoliator, the defoliator support, the leaf removal means, the vehicle steering means, and the wheel suspension. Improved means is also provided to enable the operator to observe and control the vertical position of the defoliator and the width of the defoliated swath.

The vehicle shown carries two defoliitors, one one each side of the row of stalks being defoliated. Each defoliator includes a flexible web,, extending radially from its axis of rotation, and increasing gradually in radius from a minimum at its front end. The web is helically twisted about the axis of rotation, and has a scalloped edge consisting of nodes and troughs. The stalks of the tobacco plants are alternately engaged by nodes and troughs on the webs, as the webs move forwardly along the row and downwardly along the tobacco plants.

To transport the leaves to receptacles after they have been stripped from the stalks, a leaf-removal mechanism is located beneath each defoliating member. The leaf-removal mechanisms each include plural parallel, laterally spaced, longitudinally extending rollers. All the rollers on each mechanism rotate in the same direction but in an opposing direction from that of the rollers of the other mechanism, except that the roller nearest the central gap through which the stalks pass on one mechanism rotates in the same direction as the rollers on the other mechanism, so that a leaf falling across the two rollers nearest the central gap will be transferred positively in one direction and will not be trapped in the gap, nor fall through it. Resilient idler rollers assist in moving the leaves into each receiving basket.

Each defoliator and its associated leaf-removal mechanism are mounted on a pair of transverse beams supported on pivoted links so as to be movable transversely of the vehicle and hence of the row of tobacco plants, so that the defoliators may be maintained in alignment with the row of plants. The two pairs of transverse beams are connected together for concurrent lateral movement, so that both swing together in the same direction, following the alignment of the row of stalks with respect to the vehicle. Preferably, this connection is accomplished by a pair of hydraulic cylinders, each having a piston connected to one pair of beams, and having hydraulic connections from the respective ends of one cylinder to the opposite ends of the other.

Each pair of transverse beams is supported on a vertically movable carriage guided by rollers running in vertical channels on the frame of the vehicle. The two carriages may be raised and lowered concurrently by suitable motor means under the control of the operator of the vehicle, so as to select the vertical section of the tobacco stalks which is to be defoliated on a particular pass of the machine along the row of plants.

Independent front wheel suspension is employed so that the harvester remains level in the event one wheel encounters a depression in the ground. Each front wheel suspension comprises a yoke depending from the frame and spaced from the axle on each wheel, an arm pivotally connected to the yoke at one end, and a hydraulic linear motor disposed between the second end of the arm and the yoke. The wheel is journaled in the arm at an intermediate point, spaced from both ends.

An apparatus is provided for steering the vehicle along a row of tobacco plants. This apparatus includes a mechanism such as a pair of fingers for sensing either the tobacco stalks or a wire or other guide disposed along the row of the plants and a spool valve for actuating a hydraulic motor which controls the steering mechanism. This apparatus may be manually overridden by the operator.

The operitor's seat is located at the rear of the apparatus and as low as practical, to enable the operator to observe the operation of the defoliator without having his vision obstructed by unharvested leaves.

BRIEF DESCRIPTION OF THE DRAWINGS

FIG. 3 is an enlarged view, taken along the line 3—3 of FIG. 1, with certain parts omitted for clarity and others broken away.

FIG. 4 is a perspective view of an assembly to be used in making a shaft for one of the defoliators of FIGS. 1 to 3.

FIG. 5 is a perspective view showing the assembly of FIG. 4 inserted in a hollow tubular guide member.

FIG. 6 is a perspective view showing one end of the shaft assembly of FIG. 4 twisted through 180° about the axis of the shift with respect to the other end to apply a helical twist to the shaft.

FIG. 7 is an elevational view of the twisted shaft of FIG. 6 after being withdrawn from the guide member.

FIG. 8 is a plan view, on a smaller scale than FIG. 7, of one form of defoliator, contoured in accordance with the invention, and adapted to be helically twisted by insertion in the shaft of FIG. 7.

FIG. 9 is a plan view of a slightly different form of defoliator, similar to that of FIG. 8.

FIG. 10 shows a plan view of another form of defoliator.

FIG. 11 is an elevational view, on the same scale as FIG. 7, showing the defoliator member of FIG. 8 assembled in the shaft of FIG. 7. FIG. 12 is a sectional view, taken along the line 12—12 of FIG. 1, showing a complete defoliator assembly, including two of the defoliators of FIG. 11, together with other parts of the apparatus.

FIG. 13 is an enlarged, fragmentary, sectional view, taken along the line 13—13 of FIG. 1. FIG. 14 is another fragmentary sectional view, taken along the line 14—14 of FIG. 1.

FIG. 15 is a further enlarged, fragmentary, sectional view, taken along the line 15—15 of FIG. 4. FIG. 16 is an enlarged view taken along the line 16—16 of FIG. 1 with certain parts omitted and others broken away. FIG. 17 is a fragmentary, sectional view, taken along the line 17—17 of FIG. 16.

FIG. 18 is a somewhat diagrammatic view of a vehicle steering mechanism in accordance with the invention.

FIG. 19 is a fragmentary, side elevational view showing parts of the mechanism of FIG. 18.

FIG. 20 is a sectional view, taken along the line 20—20 of FIG. 19.

FIG. 21 is an enlarged sectional view of a spool valve in the mechanism of FIG. 18.

DETAILED DESCRIPTION—FIGS. 1 TO 3

Figure 1:
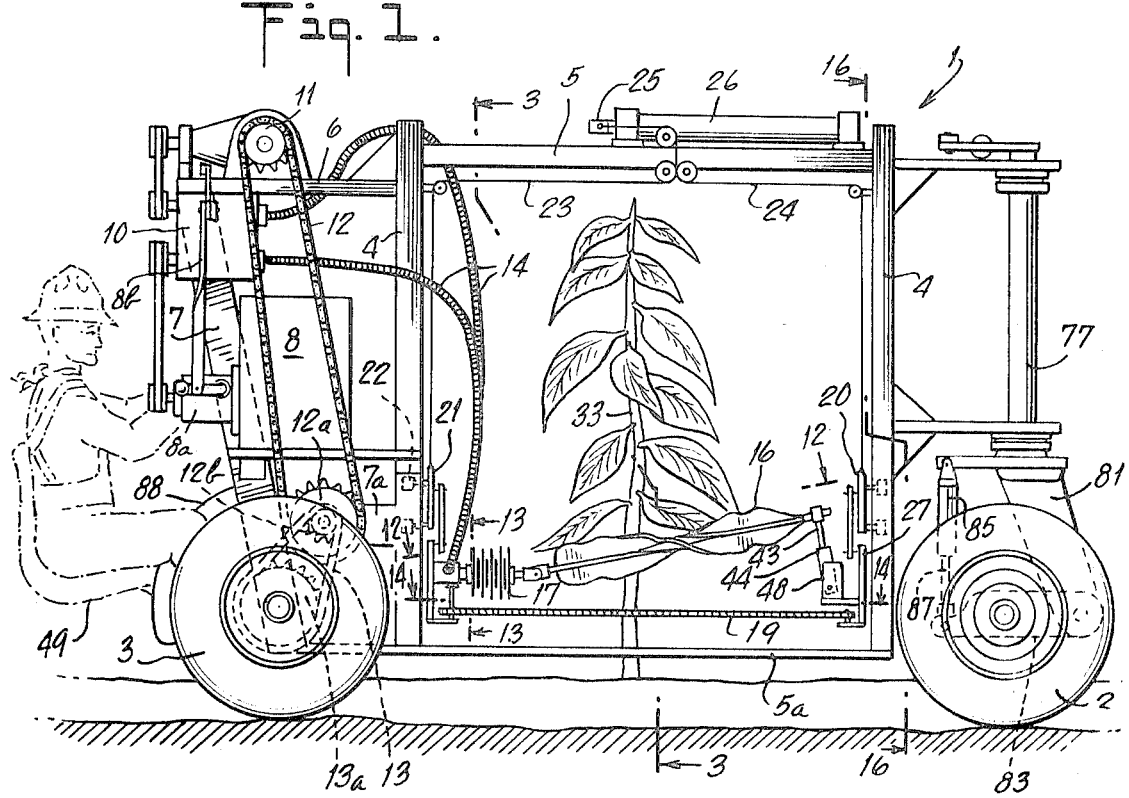
FIG. 1 is a side elevational view of a tobacco harvesting apparatus constructed in accordance with the invention, with certain parts omitted for clarity.
Figure 2:
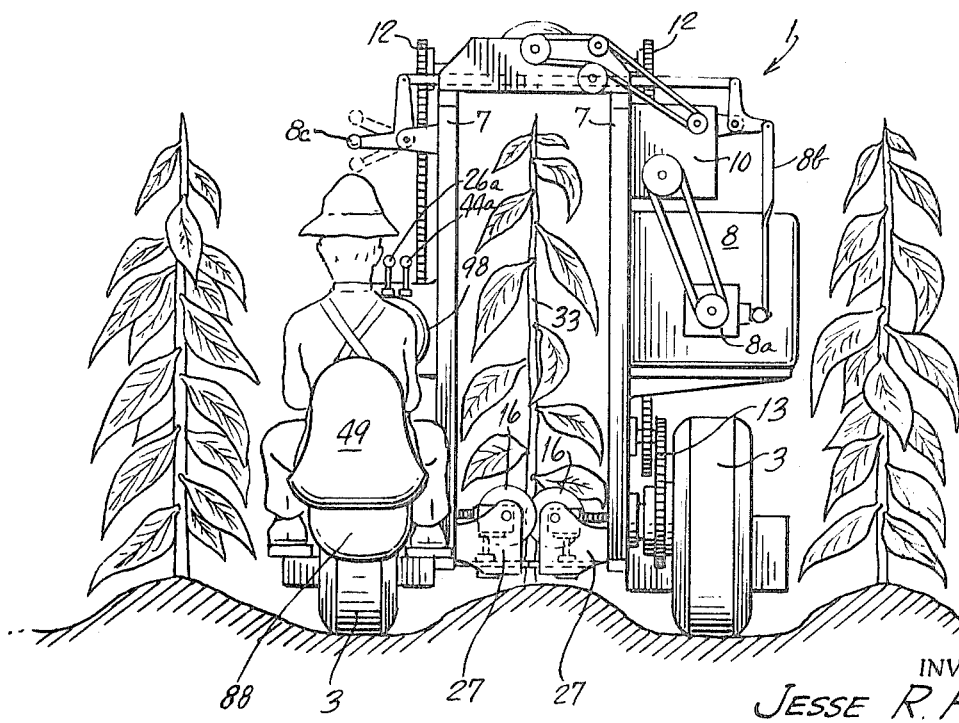
FIG. 2 is a rear elevational view of the apparatus of FIG. 1.

FIGS. 1 and 2 illustrate generally a vehicle 1 carrying tobacco-harvesting apparatus constructed in accordance with the invention. The vehicle is adapted to straddle a row of tobacco plants 33, as shown in FIG. 2, and has a pair of front wheels 2 and a pair of rear wheels 3 supporting a frame including left and right pairs of uprights 4, the pair of uprights on each side being connected at their upper ends to a longitudinal beam member 5, and at their lower ends to a longitudinal beam member 5a. Another pair of frame members 6 extend rearwardly from the rear uprights 4 and are attached at their rear ends to diagonally downwardly extending frame members 7, which support the rear wheels 3 at their lower ends. Horizontal braces 7a extend between the frame members 7 and the uprights 4. The front and rear pairs of upright 4 are connected near their upper ends to front and rear transverse beam members 9 (one of which is seen in FIG. 3). An engine 8 is mounted on the frame members and is connected by a suitable transmission generally indicated at 10 to a sprocket wheel 11 driving a chain 12 connected through another sprocket wheel 12a fixed on a shaft for concurrent rotation with a sprocket wheel 12b, and thence to a chain 13 driving a sprocket wheel 13a fixed on the shaft carrying the rear wheel 3.

Each of the gear boxes 15, which is driven by a flexible transmission link 14, drives a defoliator 16, a gleaner 17, a leaf removal means 18 (see FIG. 3), and a stalk-aligning means 19.

Each side of the vehicle includes a carriage for supporting one defoliator 16, one gleaner 17, one leaf-removal means 18, and one stalk-aligning means 19. The two carriages are driven concurrently for vertical movement with respect to the frame of the vehicle. The two carriages are also connected for concurrent literal movement to accommodate minor changes in the alignment of the vehicle with the row of tobacco stalks.

Each carriage includes a front frame member 20 and a rear frame member 21. Each frame member 20 and 21 carries a pair of rollers 22 received in a suitable guide channel in the adjacent upright 4. The frame members 20 and 21 are supported by cables 23 and 24 which run over suitable pulleys and are connected to a roe 25 driven by a hydraulic linear motor 26 or other suitable controllable motor means. The motor 26 may be actuated by the operator of the vehicle to raise or lower both ends of the carriage simultaneously, thereby raising and lowering both the defoliators 16, the gleaners 17, the leaf-removal means 18, and the stalk-aligning means 19.

A transverse beam 27 is supported on each of the frame member 20 and 21 by means of a pair of links 28 (see FIG. 3). Each pair of front and rear transverse beams 27 supports a defoliator 16, a gleaner 17, a leaf-removal means 18, and a stalk-aligning means 19. The beams 27 are connected for concurrent lateral movement by a pair of hydraulic cylinders 29, each having one end pivoted to one of the frame members 21 and having a piston (not shown) connected to a piston rod 30 pivotally connected to one of the links 28. The inner ends of the cylinders 29 on opposite sides of the vehicle are connected by a conduit 31. The outer ends of the cylinders are connected by a conduit 32. Thus, if one of the transverse beams 27 swings on its links 28 because of some contact between the tobacco stalks and some part of the mechanism carried by that beam 27, the cylinders 29 and their connections are effective to move the transverse beam 27 on the opposite side of the vehicle in the same direction. For example, if the beam 27 at the right-hand side of FIG. 3 moves to the right as shown in that figure, then the cylinders 29 are effective to produce a following movement of the left-hand beam 27 in the same direction. The space between the tobacco stalks 33 and the defoliators 16 and other apparatus carried by the beams 27 is thereby maintained evenly distributed on both sides of the row of stalks. In other words, the various mechanisms supported by the beam 27 on one side of the row of stalks cannot exert on the row of stalks a lateral force greater than that exerted by the corresponding mechanism on the other side, so that there is no net lateral force applied to the tobacco stalks which might tend to bend them over or break them.

Thus, each carriage includes a pair of parallelogram linkages, each consisting of a frame member 20 or 21, i beam 27, and a pair of links 28. The beams 27 always remain parallel to the frame members, and thus the leaf-removal means 18 and stalk-aligning means 19 always remain substantially horizontal.

Instead of connecting the various mechanisms on one side of the vehicle hydraulically to those on the other side, as shown, a mechanical connection may be used, e.g., an inverted U frame extending over the top of the vehicle and connected at its bottom ends to the transverse beams

DEFOLIATORS—FIGS. 4 TO 12

Each of the defoliators 16 comprises (see FIG. 11) a web 34 of flexible material which is held within a helically twisted shaft 35, so that the web itself retains a helical twist. It is desirable to use rubber of 50 Durometer for the web, although other materials of suitable flexibility may be employed.

The shaft 35 may be formed as illustrated in FIGS. 4 to 6 by taking two strips 35a of steel or other suitable ductile metal and welding blocks 35b between the ends of the two strips. The assembled strips 35a and blocks 35b are then placed within a tubular guide 36, which may be a pipe, having a length such that the ends of the assembly project as shown in FIG. 5. The assembly is then given a half turn helical twist between its ends by fastening the right-hand end as shown in FIG. 6 against rotation, and twisting the left-hand end as shown in that figure until the assembly retains a permanent set of 180°. The pipe 36 is then withdrawn, leaving the complete twisted shaft assembly as shown in FIG. 7. Suitable rods 37 are welded to the blocks 35b to provide for convenient attachment of the assembly to driving and supporting mechanisms.

The web 34 is cut from flat material with a contour as shown in FIG. 8. The right-hand end of the material in FIG. 8 is the leading edge, and increases gradually in diameter from a minimum which is substantially equal to the width of the strips 35a. Moving to the left in FIG. 8, after the first point of maximum diameter of the web 34 is reached, the edges of the web are contoured in a series of scallops 34a, each consisting of a portion of slowly decreasing radius 34b followed by a portion of rapidly increasing radius 34c. The opposite edges of the web 34 are symmetrical about its longitudinal axis.

FIG. 9 illustrates a modified form of web contour which may be used. The tapered nose portion of the web 38 is the same as that of FIG. 8, but the scallops 38a are reversed, and include a portion 38b of rapidly decreasing radius and a portion 38c of slowly increasing radius.

There is shown in FIG. 10 still another modified form of web generally indicated it 39. Again, the tapered nose portion of the web is the same. Here the scallops 39a consist of portions 39b of decreasing radius and portions 39c of increasing radius, but the rates of decrease and increase of the radius along the length of the web are substantially equal. The contour of each edge of the web 39 approximates a sine wave. The scalloped edge of the defoliator web enables the web to engage tobacco leaves at the front and rear as well as it the adjacent side of a stalk of a tobacco plant. Since tobacco leaves may grow at any angle around the stalk, it is necessary to engage the front and rear leaves to secure a complete harvest.

Each of the gear boxes 15 is mounted on one of the transverse beams 27, as best seen in FIGS. 12 and 13. Each gear box 15 drives a shaft 40 which carries a gleaner 17 (FIG. 12). Each gleaner 17 comprises a lightly compressed stack of sponge rubber discs, the discs being alternately of relatively long and relatively short diameters. The long diameter discs are sufficiently large so that their peripheral surfaces make contact with the large discs in the gleaner on the opposite side of the apparatus, as shown in FIG. 12.

The defoliators 16 engage the leaves and are generally effective to break them from the stalks. Nevertheless, the webs of the defoliators are relatively hard and smooth surfaced, and slip readily over the surfaces of the tobacco stalks and leaves. Hence, if a leaf is so located that the web does not make a firm engagement with it, they may occasionally partially break a leaf and leave it hanging by a few fibers. The gleaners 17 are provided to remove those leaves which are so left hinging by the defoliatos 16. The gleaners 17, being of sponge rubber, engage the stalks and the leaves more closely and with a more clinging grip. While they do not apply as much force to the stalks and leaves as do the defoliators 16, they are nevertheless more effective to grip a leaf which is only tenuously held to the stalk by a few fibers and to break those remaining fibers, thereby removing the leaf from the stalk.

The forward end of the shaft 40 is connected through a universal joint 41 to the shift 37 at the rear end of one of the defoliators 16. Each shaft 37 at the front end of a defoliator is supported in a suitable bearing 42 mounted on the end of a piston rod 43 (FIG. 1) operated by a hydraulic cylinder 44. The end of the cylinder 44 opposite the piston rod 43 is pivotally mounted on a suitable support attached to the front transverse beam 27. The hydraulic cylinder 44 are under the control of the operator so that he may change the angle of tilt of the defoliators 16, and thereby change the height of the switch along the tobacco stalks which is harvested by the machine during a single pass along the row of stalks. Each cylinder 44 moves between a pair of fixed lateral guides 48, which absorb any lateral thrust on the cylinders due to the defoliation operation, and thus protect their supporting pivot pins from excessive strain.

The operator of the vehicle 1 sits on a seat 49 located in back of and substantially on the same level with one of the rear wheels 3. The operator has under his control a steering wheel 98 controlling apparatus described below in connection with FIGS. 18 to 21. He also his under his control: (a) a lever 26a controlling, through suitable linkage (not shown), the hydraulic motor 26 which regulates the elevation of the defoliator 16 and related elements; (b) a lever 44a controlling the hydraulic motor 44, which establishes the tilt of the defoliator 16 and hence the vertical dimension of the swath of leaves on the tobacco plant which are removed by the defoliator; and (c) a lever 8c connected by suitable linkage 8b to a clutch 8a connected to the engine 8, to control the application of power from the engine to the wheels and other power driven elements.

The position of the operator at a low elevation at the rear of the apparatus enables him to observe the operation of the defoliator 16 without having his view of it obstructed by unharvested leaves located above the defoliator. The operator in this position can see the defoliator 16 when it is in its lowest position, as shown in FIG. 1. As it is moved to higher positions on subsequent harvesting passes along the row, he can still observe its position and operation, since all the leaves below it will already have been harvested and removed. The leaves above the defoliator are never in a position to obstruct the operator's view.

A suitable guard 88 protects the operator from mud and dust thrown up by the wheel 3, and prevents him from getting his feet accidentally engaged by the rotating wheel.

LEAF REMOVAL MECHANISM——FIGS. 3, 13 AND 15

These figures illustrate the leaf removal mechanism 18 for collecting the leaves after they are stripped of the stalks 33 by the defoliators 16. Under each defoliator 16 is provided a roller conveyor consisting of a plurality of parallel rollers 51 arranged longitudinally of the vehicle and contact at their ends in the beams 27. Each roller 51 is placed slightly higher than the next adjacent roller on the side toward the row of tobacco stalks, so that the rollers 51 together form an upwardly inclined conveyor, which increases in steepness as the leaves travel away from the tobacco stalks.

The two outermost rollers 51 on each set have cooperating with them two idler rollers 52 (best seen in FIG. 3 and 15), each carrying in array of hollow rubber tires 52a. The spacing between the rollers 51 and the rollers 52 is selected to compress the tires 52a slightly at their points of contact with the roller 51, so as to grip the tobacco leaves as they move along the outer rollers and drive them upwardly and outwardly over the outermost roller 51 and into a collector receptacle 54. The collector receptacle is mounted on the beams 27 for ready removal so that the leaves may be emptied therefrom for processing.

The two sets of rollers 51 define between them a central gap, identified by the reference numeral 50 in FIG. 13, through which the stalks of the tobacco plants pass as the vehicle moves along the row of stalks. The rollers 51 are continuously driven by roller chains 53 through sprocket wheels 53a located at the rear ends of the rollers 51, just in front of the beam 27. Each chain 53 also runs over suitable guide sprocket wheels 48 and a drive sprocket wheel 45, driven by means of a flexible transmission link 46 connected to one of the gear boxes 15. The chains 53 and the sprocket wheels 53a are enclosed by a cover 47 to prevent engagement of the tobacco leaves by the chain and the sprocket wheels. Alternatively, the chains and sprocket wheels may be located behind the beams 27.

All of the rollers 51 in one set, such is the one appearing at the right in FIG. 3 (actually at the left of the machine, since FIG. 3 is looking toward the rear), turn in the clockwise direction, is shown by the arrows in the drawing, so as to move any harvested leaves away from the roller stalks. All of the rollers 51 in the other set, except the roller 51a nearest the central gap 50, turn in the opposite direction. The roller 51a turns clockwise, i.e. in the same direction as the rollers in the right-hand set, so that a harvested leaf bridging the gap is driven positively to one side, rather than being allowed to rest on two rollers acting in opposite directions. Thus, the possibility for a leaf to fall between the two rollers nearest the gap is minimized. It should be noted that the stalks of the tobacco plants passing through the gap 50 tend to engage and brush aside any leaf which happens to bridge the gap. The two rollers 51a turning the same direction cooperate with the tobacco stalks to remove any such bridging leaves and to prevent them from piling up or falling through the gap.

STALK-ALIGNING MEANS—FIGS. 13 AND 14

The stalk-aligning means 19 positions the stalks of leaning or otherwise misaligned tobacco plants so that the leaves may be readily stripped therefrom. It also supports such stalks laterally during the stripping operation. It comprises two endless bands 60 disposed on opposite side of a row of tobacco plants. The rear ends of the bands pass over drive sprocket wheels 62 fixed on shafts 63 journaled in suitable brackets 72a fixed on the rear beams 27. The shafts 63 are driven by means of suitable connections to gear boxes 15. The bands 60 move along an inner, positioning reach and an outer return reach, both of which are parallel to the row of stalks. After leaving the return reach, they pass along 9 diagonal entrance reach, where they are effective to engage a misaligned stalk and guide it to an upright position. Idler sprocket wheels 66 are fixed on vertical shafts 67 journaled on brackets 27b on the front beams 27 to support the endless bands 60 at the front ends of their return reaches. The idler wheels 66 are of smaller diameter than the drive wheels 62. Another pair of idler wheels 68 are supported on shafts 69 carried by brackets 27b. The wheels 68 are located between and somewhat to the rear of wheels 66. The idler wheels 66 and 68 cooperate to define the entrance reaches of the endless bands 60, where they gradually enter into contact with the stalks, so that the stalks do not abruptly encounter the bands. It should be noted that the term "band" as used herein is intended to be a generic term encompassing both belts and roller chains of various types.

Disposed on each endless band 60 at spaced intervals are a plurality of lugs 70. In the preferred form of the invention, the endless bands 60 are conventional roller chains having a plurality of interengaging links, the links being suitable for cooperation with sprocket guide wheels 62, 66 and 68. Thus, the lugs 70 may be projections or fingers extending from the links of the chain.

The endless bands or chains 60 are driven at a linear speed substantially equal to the forward speed of the vehicle 1 carrying the defoliators 16. This may be readily accomplished since the endless bands 60 are driven from the transmission 10 which drives the rear wheels 3 concurrently. It is only necessary to design the motion transmitting links between the transmission 10 and the wheels 3 on the one hand and the links between that transmission and the guide wheels 62 on the other hand so as to produce equal linear speeds at the periphery of the wheels 3 and at the periphery of the guide wheels 62. It should be noted that guide wheels 62 must both be driven from the same source of motion so that the lugs 70 on the two bands 60 remain in alignment. Thus, on the inner, positioning reach of the bands 60 adjacent the tobacco stalks, the bands are moving backwardly at the same speed that the vehicle 1 carrying them is moving forwardly. The lugs 70 then form a series of frames 71 between two corresponding adjacent lugs on each of the endless bands so that each tobacco stalk in the row is surrounded by a frame which not only positions the stalk for defoliation but also supports it laterally and longitudinally, so that it will not be broken or bent by the defoliating operation.

Since the linear speed of the bands 60 with respect to the vehicle 1 carrying them is substantially equal to the linear speed of that vehicle over the ground, it will be readily understood that the positioning reach of the chains, as they travel from the idler wheels 68 to the rear guide wheels 62 moves substantially at zero speed with respect to the ground, while the return reach of the bands, i.e. from the rear guide wheels 62 to the front guide wheels 66, moves at substantially twice the vehicle speed with respect to the ground. As a link of the chain passes around a front guide wheel 66 or 67, it decelerates from a maximum speed with respect to the ground at the point where it first engages the front guide wheel to zero speed at the point where it leaves the idler guide wheel 68 or 69. Thus, as the links and lugs approach their point of entry into the positioning reach, they have a small and diminishing component of forward motion with respect to the ground. This enables them to engage and position a leaning or misaligned stalk gently and without substantial impact. Furthermore, as they leave the positioning reach, they have a small but increasing component of forward motion with respect to the ground. Thus the links and lugs also separate slowly, rather than abruptly, from the stalks they have been supporting.

FRONT WHEEL SUSPENSION—FIGS. 1, 16 AND 17

Each front wheel 2 is mounted on the lower end of a rotatable tubular shaft 77, journaled by suitable bearings in the frame of the vehicle 1. A yoke 81 extends downwardly and forwardly from the lower end of each shaft 77. An arm 83 is pivoted on the lower end of yoke 81 and extends rearwardly therefrom. The wheel 2 rotates on an axle 82 journaled at an intermediate point in the arm 83. At the rear end of the arm 83, a piston rod 87 is pivotally connected. A cylinder 85 encloses a piston attached to the rod 87. The end of cylinder 85 opposite the piston rod is pivotally connected to the yoke 81. The cylinder 85 and rod 87 constitute an extensible link. Thus, yoke 81, arm 83, and hydraulic linear motor 85 are arranged in a triangular configuration.

A conduit 89 connects the upper ends of the cylinders of the hydraulic linear motors 85 of each pair of wheels, the conduit being disposed within the tubular shafts 77 and along the transverse beam member 9. Therefore, if one wheel, for example, the right-hand wheel 2 in FIG. 16, should encounter a depression, the piston rod 87 of the cylinder 85 of that wheel will be displaced outwardly relative to that cylinder. This displacement creates a drop in pressure within that cylinder, and also causes a disproportionate share of the load to be carried by the opposite wheel 2, thereby producing an increase in pressure in the opposite cylinder. This difference in pressure produces a flow of hydraulic fluid from cylinder 85 on the high pressure wheel to the cylinder 85 on the low pressure wheel. The result is that part of the load from the high wheel is transferred to the low wheel until the load is equally divided between the two wheels. This prevents the dropping of one wheel relative to the other from producing any twisting forces on the frame of the vehicle, and the frame is maintained substantially horizontal.

It should be noted that the suspension means may be employed for each wheel of the vehicle and is not limited to utilization with only the front wheels.

ROW FOLLOWING STEERING CONTROL—FIGS. 18–21

In FIGS. 18–21 there is shown a mechanism for controlling a vehicle to follow an externally defined path. In this particular case, the path is defined by a row of tobacco plants. This mechanism is shown interconnected with a manually controlled hydraulic steering mechanism and is intended to remain in a resting or neutral state so long as the vehicle 1 remains in a path longitudinal of the row of plants. The manual steering mechanism is capable of overriding the row following control mechanism.

The two front wheels 2 are steerable by rotation of the vertical shafts 77 (see FIGS. 16 and 17) on which they are mounted. At their upper ends, the shafts 77 are supported by brackets 80 attached to the frame of the vehicle. Above the brackets 80, each of the shafts 77 has fixed to it an arm 84. A link 86 connects the two arms 84 on the opposite sides of the vehicle, so that the two front wheels are steered together.

One of the two arms 84 is connected by a piston rod 90 to a piston 91 in a cylinder 92 pivotally mounted at one end of the frame of the vehicle, as shown at 93. The opposite ends of the cylinder 92 are connected through conduits 94 and 95 to two parallel control valves 96 and 97. The control valve 96 is operable manually by the operator of the vehicle through a conventional steering wheel 98. The control valve 97 is operated by the row following control mechanism.

The row following control mechanism includes a pair of fingers 100, which are fixed at their rear ends on vertical shafts 101 (see FIG. 20) journaled in brackets 102 extending inwardly from the lower side frame members 5a of the vehicle. The fingers 100 are curved, being convex on the side toward the tobacco plants 33.

Each of the shafts 101 carries at its upper end a sprocket wheel 103 over which runs a roller chain 104, which also passes over another sprocket wheel 105 fixed on a vertical shaft 106 journaled adjacent its ends in the longitudinal frame members 5 and 5a of the vehicle.

The roller chains 104 and their associated sprocket wheels 103 and 105 are enclosed by covers 108, to prevent engagement of the tobacco leaves in the chains or sprocket wheels.

Above the frame member 5a, the shaft 106 carries an arm 107. The two arms 107 at the opposite sides of the vehicle are connected through a link 110 for concurrent movement. If desired, a suitable strain relief mechanism may be inserted in the link 110 to permit independent movement of the fingers 100, in the event that they engage an obstruction which will not allow their concurrent movement in the same directions. One of the arms 107 is pivotally connected to the stem 111 of valve 97. As shown in FIG. 21, the valve 97 is self-centering, being biased to a central position by opposed springs 112.

Upon movement of the valve 97 from its central position, as upon engagement of one of the fingers 100 with the stalk 33 of a tobacco plant, the valve 97 is effective to connect one side of the cylinder 92 to a source of hydraulic fluid under pressure, such as the pump 113, and to connect the opposite end of the cylinder to a drain, such as the sump 114. The cylinder 92 then becomes effective to steer the vehicle in a direction to take the finger 100 out of contact with the stalk 33, whereupon the springs 112 will become effective to restore the valve 97 and its associated parts to their normal center position. As long as the fingers 100 remain in their normal positions, i.e. with a normal spacing between them, and without engaging a tobacco stalk, then the valve 97 remains in its central position. If, however, one of the fingers 100 engages a tobacco stalk, then that finger is deflected and moves the valve 97 to steer the vehicle so as to carry the finger 100 out of contact with the tobacco stalk. In this way, the vehicle follows the row of tobacco stalks, being guided by the stalks themselves.

The operator of the vehicle can at any time override the stalk following steering control system by operation of his steering wheel 98. This overriding capability may be provided simply by making valve 96 of a larger capacity than valve 97, so that the fluid supplies and leaks established by operation of valve 96 are bigger than any passage that may be established through valve 97, and hence have an overriding effect on the operation of cylinder 92.

While, in the apparatus illustrated, the row following steering mechanism is illustrated as being actuated by contact of the fingers 100 with the stalks 33 of the tobacco plants, it could alternatively be arranged to follow a suitable external guide structure, such as a wire strung over head along the length of the row of tobacco plants. Another alternative would be to have the row following sensing device such as the fingers 100 engage a rail or alley or curb placed along the ground rather than a wire elevated above the rot of tobacco plants. However, the apparatus shown presents a distinct advantage over the alternatives mentioned, because no external guide is required.

The apparatus illustrated shows a vehicle adapted to straddle a single of row of tobacco plants and having two defoliators, one acting on each side of the tobacco plants in that row. Alternatively, the vehicle could be adapted to run between the rows of suitably spaced tobacco plants, with defoliators on one or both sides, engaging only one side of the tobacco plants in the adjacent rows. As another possible alternative, the vehicle might straddle more than one row of tobacco plants, and might carry two defoliators for both sides of each straddled row, and possibly an additional defoliator to engage one side only of each next adjacent row which was not straddled.

I claim:

1. Apparatus for harvesting tobacco leaves, including:
   a. a vehicle adapted to pass along a row of tobacco plants;
   b. an elongated defoliator mounted on said vehicle adjacent the row of plants and rotatable about an axis extending along said row, said defoliator having its front end higher than its rear end;
   c. means for rotating the defoliator concurrently with forward motion of the vehicle; and
   d. at least one flexible web on said defoliator extending outwardly from said axis;

wherein the improvement comprises:

e. said web has a radius varying cyclically along its length to define a plurality of nodes and troughs along the outer edge of the web, said nodes and troughs cooperating upon rotation of said web to engage the tobacco leaves at the front and rear as well as the adjacent side of a stalk of a tobacco plant, and remove the engaged leaves from the stalks.

2. Apparatus as defined in claim 1, wherein each said web has a tapered leading edge.

3. Apparatus as defined in claim 1, in which each cycle of variation of the web radius, proceeding from the front toward the rear of the defoliator, comprises a portion of rapidly increasing radius followed by a portion of relatively slowly decreasing radius.

4. Apparatus as defined in claim 1, wherein each cycle of variation of the web radius, proceeding from the front toward the rear of the defoliator, comprises a portion of slowly increasing radius followed by a portion of relatively rapidly decreasing radius.

5. Apparatus as defined in claim 1, in which each cycle of variation of the web radius, proceeding from the front toward the rear of the defoliator, comprises a portion of increasing radius followed by a portion of decreasing radius, both the increase and decrease being substantially equal functions of the distance along the defoliator.

6. Apparatus as defined in claim 1, further comprising an engine on said vehicle for driving its wheels; and a flexible transmission link for transmitting mechanical motion from said engine to said defoliator to drive the defoliator at a speed proportional to the forward speed of the vehicle.

7. Apparatus as defined in claim 6, including a parallelogram linkage for supporting the defoliator so that it may move substantially horizontally toward and away from the row of tobacco plants.

8. Apparatus as defined in claim 7, including:
   a. a roller conveyor supported by said parallelogram linkage and located under the defoliator;
   b. said roller conveyor comprising a plurality of rollers extending in the fore and aft direction of the vehicle and effective to catch leaves stripped from the plants by the defoliator and move them laterally away from the tobacco stalks.

9. Apparatus for harvesting tobacco leaves, including:
   a. a vehicle adapted to pass along a row of tobacco plants;
   b. an elongated defoliator mounted on said vehicle and adapted to engage at least one side of the tobacco plants as the vehicle passes them and to remove the leaves therefrom; and
   c. conveyor means located under the defoliator for catching and removing the leaves stripped from the plants by the defoliator;

wherein the improvement comprises:

d. said conveyor means comprising a plurality of rollers rotating about axes parallel to the fore and aft direction of the vehicle and effective to convey the leaves laterally away from the row of tobacco plants;
   e. a collector receptacle positioned alongside the roller conveyor at the outside thereof;
   f. resilient idler roller means yieldably engaging at least the outermost roller in the conveyor means and cooperating with said outermost roller to grip the tobacco leaves and drive them into the receptacle.

10. Apparatus for harvesting tobacco leaves including:
    a. a vehicle adapted to pass along a row of tobacco plants;
    b. two defoliators, one on each side of the row of tobacco leaves; and
    c. two leaf removal roller conveyors, one located below each defoliator;
    d. means to drive all the parallel rollers in one conveyor in the same direction;
    e. means to drive all the parallel rollers in the other conveyor, except the roller nearest the center gap between the conveyors, in the opposite direction; and f. means to drive said roller nearest the center gap in said one direction so that a leaf falling across the gap engages two rollers, both rotating in the same direction.

11. Apparatus for harvesting tobacco leaves, comprising:
   a. a vehicle adapted to pass along rows of tobacco plants with its wheels moving in the spaces between the rows; and
   b. a defoliator supported on said vehicle for engaging the leaves and stalks of plants in an adjacent row in a vertically limited section where the leaves have ripened and stripping from the stalks the leaves in said section without disturbing the unripened leaves above said section.

wherein the improvement comprises:
   c. power lift means controllable by an operator of the vehicle for changing the elevation of the defoliator to select the particular vertical section of the plants to be defoliated; and in which
   d. the front end of the defoliator is higher than the rear end; and including power means controlled by the operator for changing the angle or tilt of the defoliator so as to control the vertical dimension of the section of the plants defoliated.

12. Apparatus for harvesting tobacco leaves including:
   a. a vehicle adapted to pass along a row of tobacco plants;
   b. an elongated defoliator mounted on said vehicle adjacent the row of plants and rotatable about an axis extending along said row, said defoliator having its front end higher than its rear end;
   c. means for rotating the defoliator concurrently with the forward motion of the vehicle; and
   d. means supporting the defoliator on the vehicle;

wherein the improvement comprises:
   e. said supporting means includes a parallelogram linkage allowing the defoliator to move horizontally toward and away from the row of tobacco plants; and
   f. power operating means supported by said parallelogram linkage for controlling the angle of tilt of the defoliator.

13. Apparatus for harvesting tobacco leaves including:
   a. a vehicle adapted to pass along a row of tobacco plants;
   b. a pair of elongated defoliators mounted on said vehicle adjacent the row of plants and rotatable about an axis extending along said row, said defoliators having their front ends higher than their rear ends;
   c. means for rotating the defoliators concurrently with the forward motion of the vehicle;
   d. means supporting the defoliators on the vehicle, said supporting means including a parallelogram linkage for each of the defoliators, thereby allowing the defoliators to move horizontally toward and away from the row of tobacco plants; and
   e. means connecting the defoliators for concurrent movement in the horizontal direction, said connecting means comprising:
      1. a hydraulic cylinder mounted on a laterally fixed link of said parallelogram linkage;
      2. a piston within said cylinder and connected to a piston rod having a pivotal connection with a swinging link of the parallelogram linkage; and
      3. conduits connecting the ends of the cylinder on one side of the vehicle to the respectively opposite ends of the cylinder on the opposite side of the vehicle, so that the two pistons move concurrently in the cylinders.

UNITED STATES PATENT OFFICE
CERTIFICATE OF CORRECTION

Patent No. 3,601,959          Dated August 31, 1971

Inventor(s) Jesse R. Pinkham

It is certified that error appears in the above-identified patent and that said Letters Patent are hereby corrected as shown below:

Col. 1, line 30, after "as", the word "the" should read -- they --.

Col. 3, line 58, the word "literal" should read -- lateral --;

line 66, "roe" should read -- rod --.

Col. 4, line 38, after "beams" -- 27. -- should appear.

Col. 5, line 9, "it" should read -- at --;

line 38, "shift" should read -- shaft --;

line 47, "switch" should read -- swath --;

line 57, "his" (first occurrence) should read -- has --;

Col. 6, line 10, "of" should read -- from --;

line 13, "contact" should read -- journaled --;

line 21, "in" should read -- an --;

line 59, after "turning" the word -- in -- should appear.

UNITED STATES PATENT OFFICE
CERTIFICATE OF CORRECTION

Patent No. 3,601,959            Dated August 31, 1971

Inventor(s) Jesse R. Pinkham

It is certified that error appears in the above-identified patent and that said Letters Patent are hereby corrected as shown below:

Col. 7, line 4, "9" should read -- a --.

Col. 8, line 58, "of" should read -- on --.

Col. 9, line 49, "rot" should read -- row --.

Signed and sealed this 1st day of August 1972.

(SEAL)
Attest:

EDWARD M. FLETCHER, JR.           ROBERT GOTTSCHALK
Attesting Officer                 Commissioner of Patents